July 12, 1949. T. W. KENYON 2,475,746
RADAR ANTENNA STABILIZER
Filed Jan. 25, 1947 5 Sheets-Sheet 1
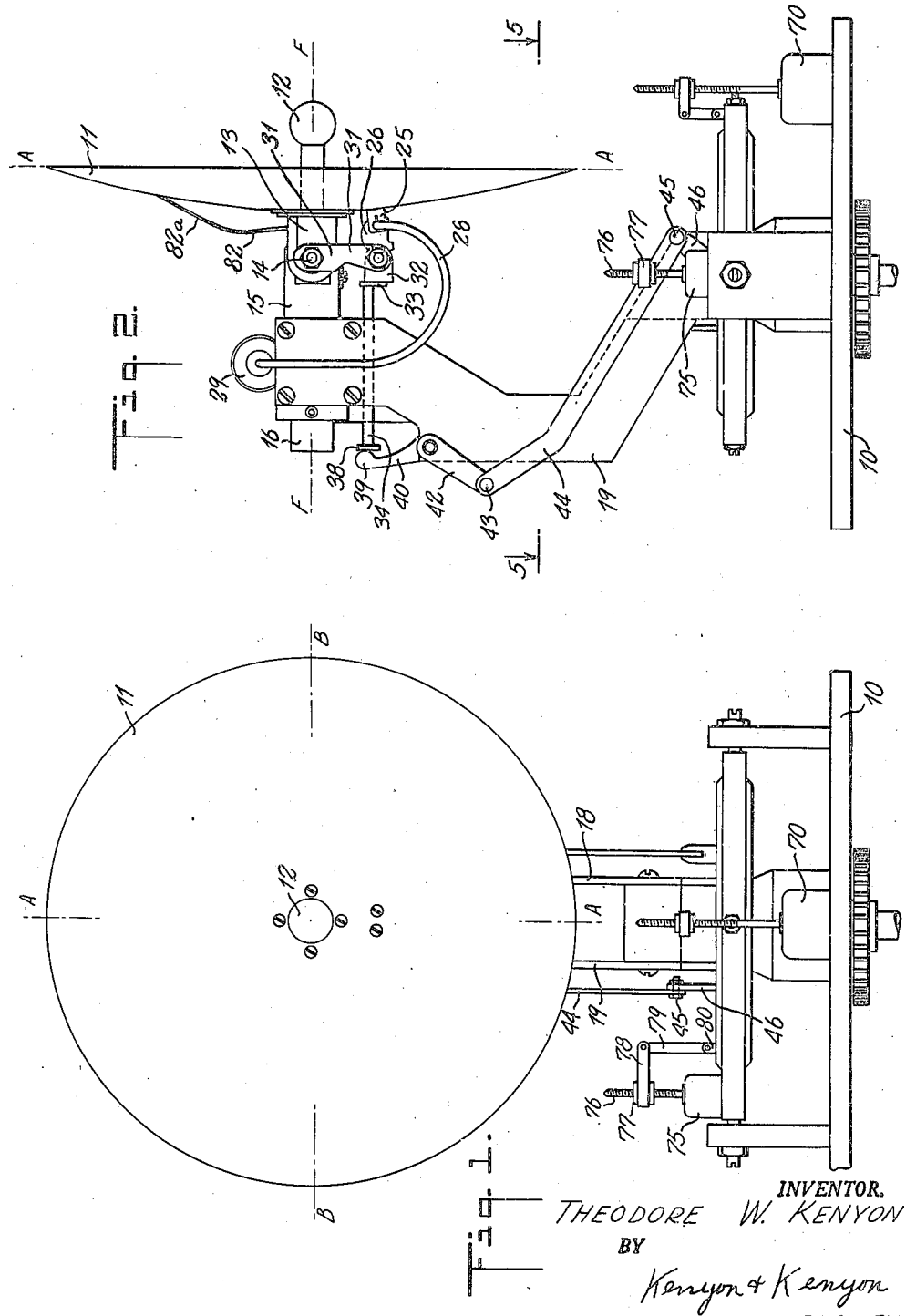
INVENTOR.
THEODORE W. KENYON
BY
Kenyon & Kenyon
ATTORNEYS

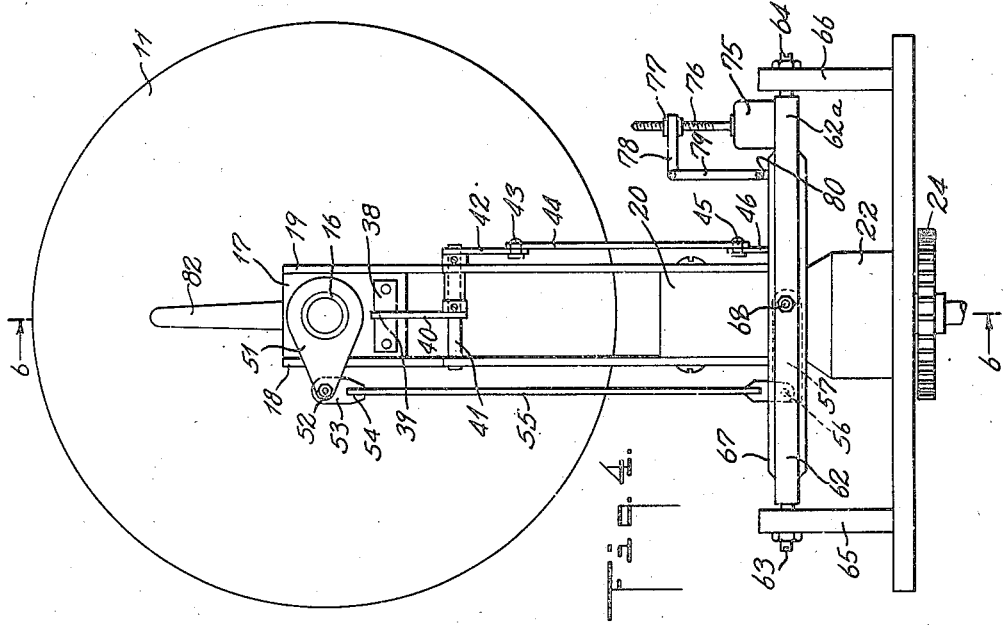
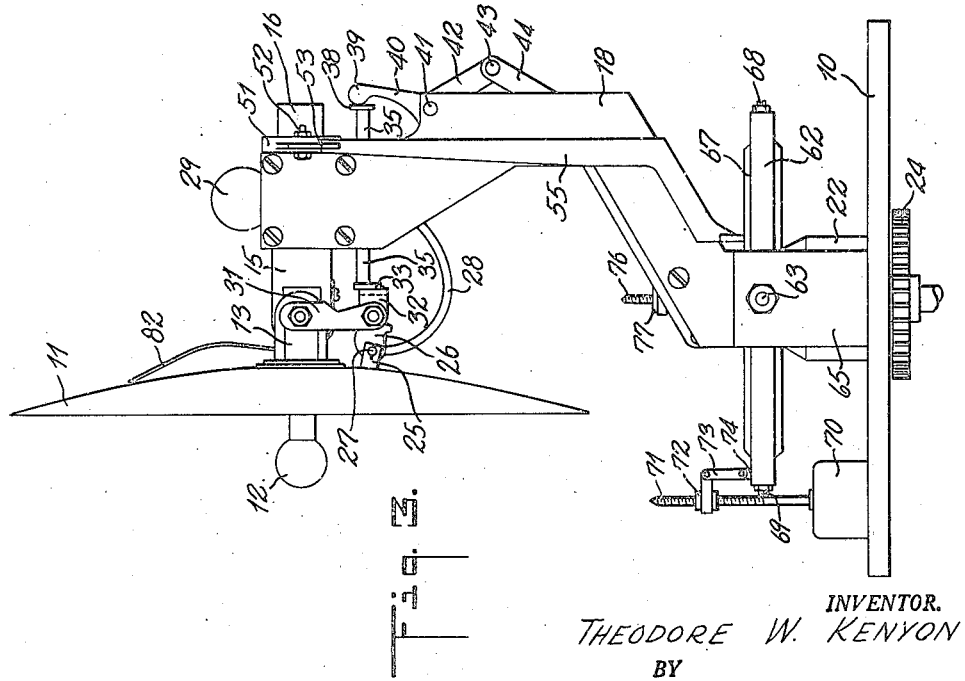

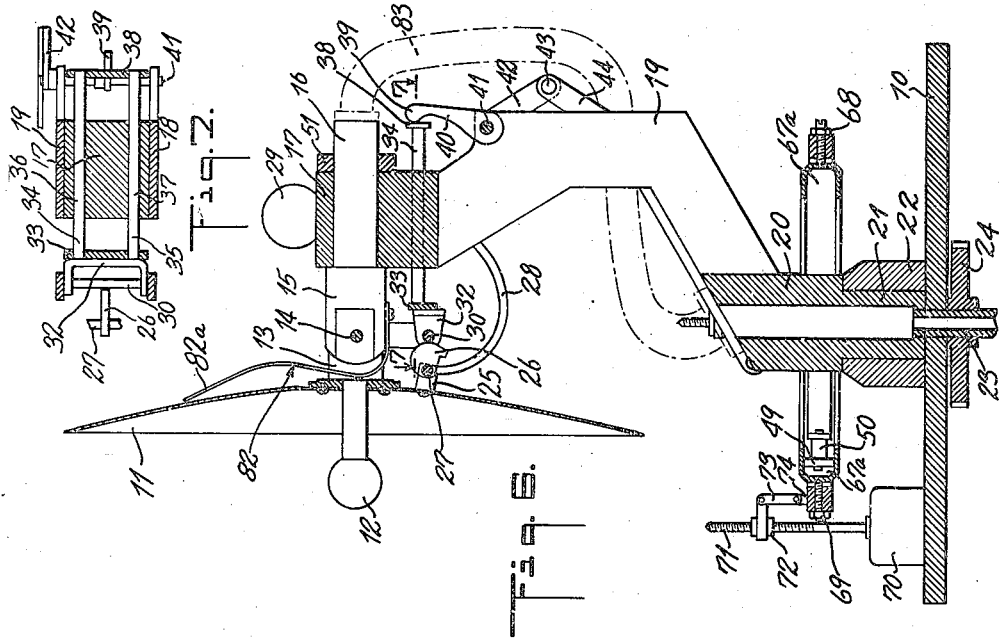
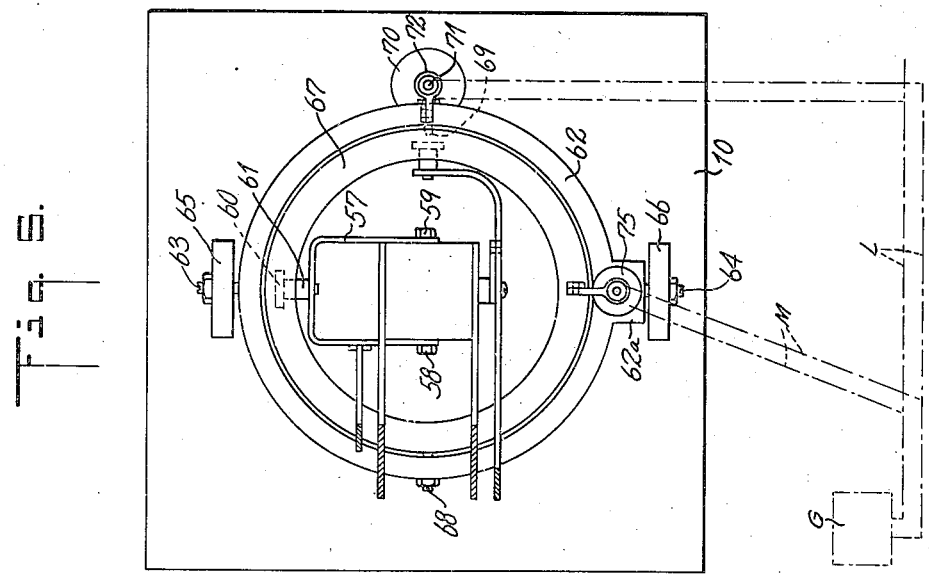

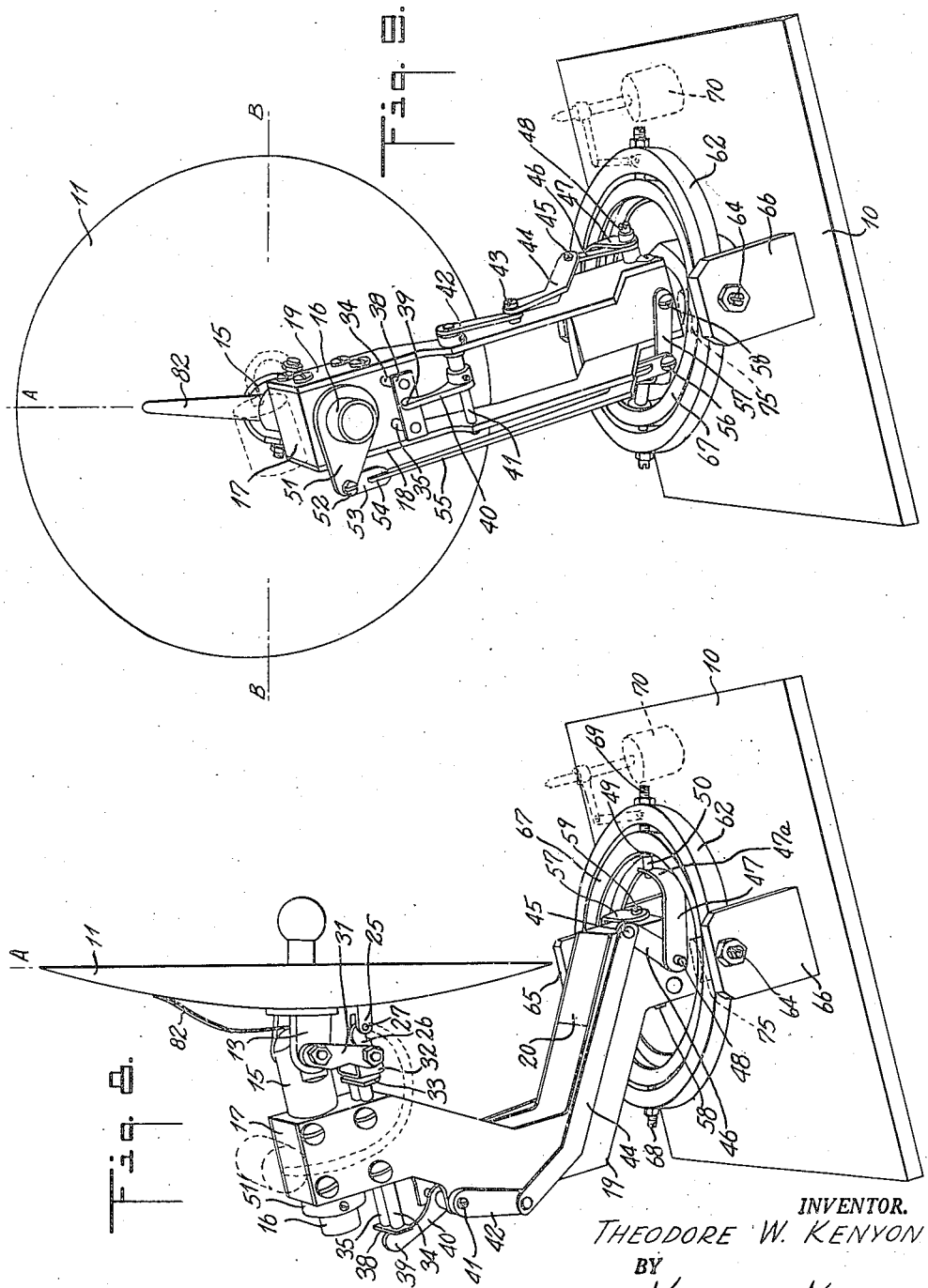

July 12, 1949.  T. W. KENYON  2,475,746
RADAR ANTENNA STABILIZER
Filed Jan. 25, 1947  5 Sheets-Sheet 5
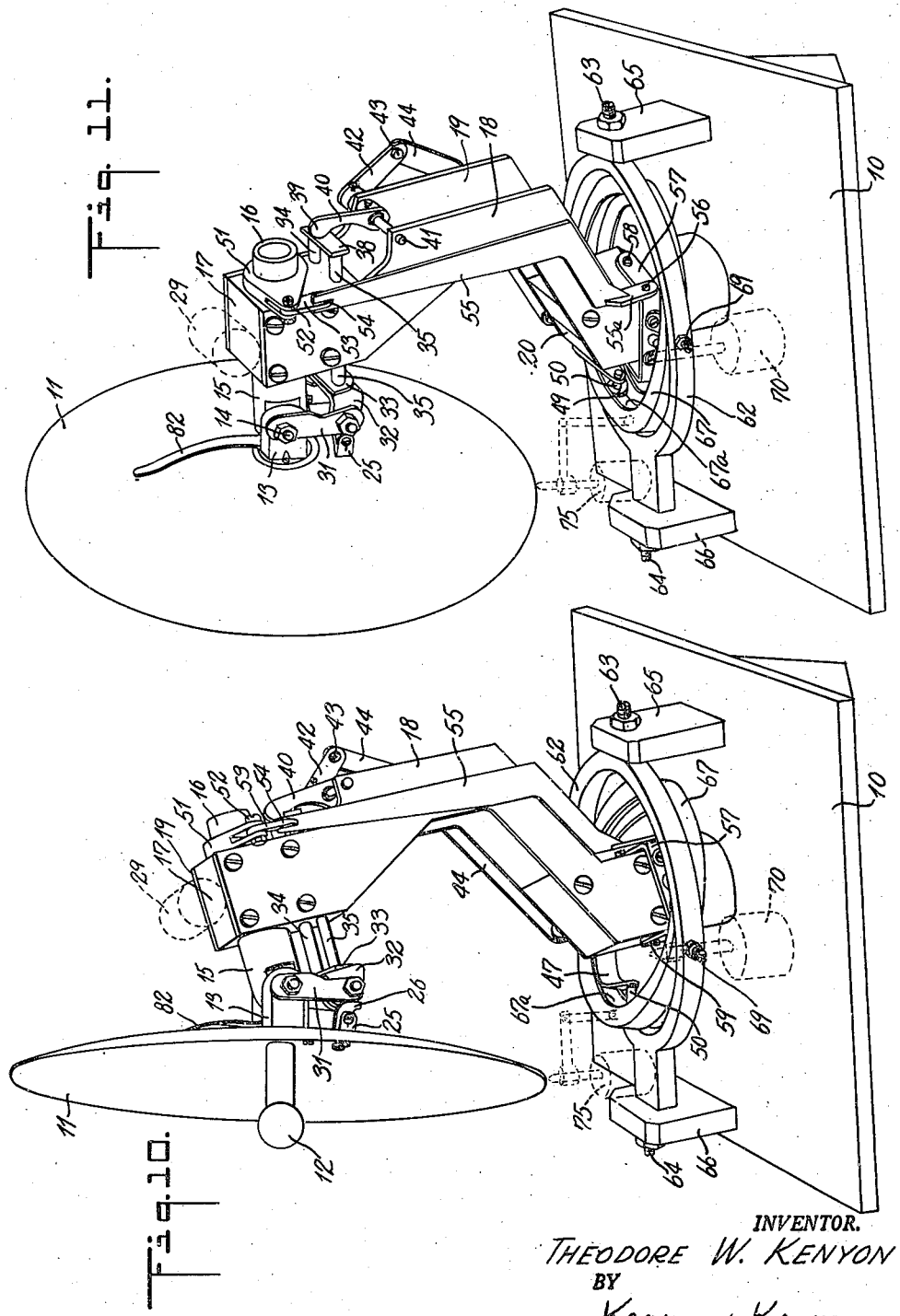
INVENTOR.
THEODORE W. KENYON
BY
Kenyon & Kenyon
ATTORNEYS Patented July 12, 1949

2,475,746

UNITED STATES PATENT OFFICE 2,475,746

RADAR ANTENNA STABILIZER

Theodore W. Kenyon, Huntington, N. Y., assignor to Kenyon Gyro & Electronics Corporation, Huntington, N. Y., a corporation of New York Application January 25, 1947, Serial No. 724,342

3 Claims. (Cl. 250—33.65)

This invention relates to a stabilizer for a radar antenna and more particularly to a stabilizer arrangement for such antenna to be used in conjunction therewith when the antenna is mounted in or upon an aircraft.

It is essential to stabilize the antenna of an airborne radar so that the picture presented to the observer in the airplane will not shift, tilt or leave the field of view while the airplane is either banked with changes in its transverse axis direction, or while its pitch or longitudinal axis changes direction or while a combination of these two motions occurs. Such changes in the airplane axes may either be accidental as, for example, the result of an air bump or directly the result of a turn or climb or a combination of the latter two.

The antenna consists of a reflector that is usually parabolic and a suitable radiator together with associated equipment which are rotated or oscillated about a vertical axis at various speeds in the neighborhood of 60 revolutions per minute. The necessary driving and control motors, the bearings, the radar guide power joints and associated equipment generally comprise a fairly heavy assembly. Heretofore, some attempts have been made to stabilize the whole assembly in order to compensate for changes in the airplane "attitude." While this approach is feasible, it is cumbersome, slow acting, and requires powerful servo-motors which are large and require considerable energy to operate them. Moreover, the inertia of the large masses makes it difficult to secure quick and accurate stabilization.

A principal object of this invention is to provide a simple stabilizing arrangement in which it is possible to secure desired uniformly maintained directional effect of a radar antenna on an aircraft by compensating adjustment simply of the radar reflector without requiring adjustment or stabilization of the entire support and mechanical equipment associated with the antenna.

Another object of the invention is to provide a simple mechanical system for effecting the desired stabilization which is responsive quickly and accurately to changes resulting from changes in pitch or bank of the aircraft or a combination of these two.

A further object of the invention is to provide apparatus of the character described that is operated simply by light low powered servo-motors controlled in turn, for example, by a gyroscope.

Another object of the invention is to provide a stabilizing arrangement which eliminates the necessity for effecting stabilization of the entire radar antenna and its complicated heavy associated mechanisms.

A further object of the invention is to provide a stabilizing arrangement that is mechanically sound, has a minimum of operating parts and that is comparatively simple and easy to construct and assemble.

Yet another object is to provide a stabilizing arrangement which obviates the necessity for stabilizing heavy massive equipment associated with the radar antenna.

To the accomplishment of the foregoing and such other objects as may hereinafter appear, the invention comprises the novel construction and arrangement of parts hereinafter to be described and then sought to be defined in the appended claims, reference being had to the accompanying drawings forming a part hereof, which show merely for the purposes of illustrative disclosure, a preferred embodiment of the invention, it being expressly understood, however, that changes may be made in practice within the scope of the claims without digressing from the inventive idea.

In the drawings in which similar reference characters denote corresponding parts:

Fig. 1 is a front elevation of a proposed embodiment of the mechanism in which the radar reflector is the part receiving compensating adjustment to compensate for changes in roll (bank) or pitch of the aircraft;

Fig. 2 is a side elevation of the device of Fig. 1;

Fig. 3 is a similar side elevation of the opposite side of the device of Fig. 1;

Fig. 4 is a rear elevation of the device of Fig. 1;

Fig. 5 is a transverse section taken along 5—5 of Fig. 2 and viewed in the direction of the arrows;

Fig. 6 is a vertical section taken along line 6—6 of Fig. 4 and viewed in the direction of the arrows;

Fig. 7 is a transverse section taken along line 7—7 of Fig. 6 and also viewed in the direction of the arrows;

Fig. 8 is a side elevation similar to that of Fig. 2 illustrating the position assumed by the parts when the aircraft is in a banking position;

Fig. 9 is a similar view with the entire antenna rotated 90° about the support axis from the position shown in Fig. 8;

Fig. 10 is a side elevation similar to that of Fig. 3 showing the position assumed by the parts when the aircraft has both roll or bank and pitch; and Fig. 11 is a view similar to that of Fig. 10 when the antenna assembly has been rotated about its support axis to a different position from that of Fig. 10.

Referring to the drawing, 10 denotes some portion of the aircraft, for example, one of the crossbars of the fuselage frame or any other rigid portion of the craft. The radar antenna comprises a reflector 11 usually parabolic and a radiator 12 which is positioned to extend forwardly of the reflector 11 along the focal axis F—F thereof. A bracket 13 which, in the embodiment shown, is substantially U-shaped, is secured to the rear of the reflector 11. This bracket 13 is secured pivotally at 14 to a stub shaft 15. This shaft 15 has an extension 16 of reduced diameter which is rotatably borne in a bearing 17 (Fig. 6). The bearing 17 is fixedly supported between the upper portions of a pair of rigid frame members 18, 19 (Fig. 3) so that the normal position of shaft 15, 16 is horizontal. Each of the frame members 18, 19 extends downwardly from the bearing 17 and the lower ends of these frame members are joined to opposite faces of a block 20. The block 20 in turn has a shaft part 21 (Fig. 6) of reduced diameter that is borne normally vertically in a bearing 22 carried by the airplane frame part 10. An extension 23 of the shaft part 21 of smaller diameter than the latter extends through an opening in the frame part 10 and has a gear 24 splined or otherwise fixed thereto for rotating the shafts 23, 21, the block part 20 and the two frame parts 18, 19 about the normally vertical axis of the shaft parts 21 and 23. The latter axis constitutes the support axis of the antenna. The normal and fixed disposition of the shaft 15 and its extension 16 in the bearing 17 is at right angles to the support axis of the shafts 21 and 23. For purposes presently to be described, the shaft portions 15, 16 and the block 20 and its associated shaft parts 21, 23 are hollow. For convenience the block 20, frame members 18, 19 and block 17 may be designated as the antenna mast or mast assembly.

The angle of tilt of the reflector 11 relative to the pivot 14 and, consequently, with respect to the mast is adjustable, means, however, being provided for maintaining any adjusted tilt position. For this purpose bracket arm members 25 are secured suitably to extend from the back face of the reflector 11. A cam 26 is supported on an adjustable shaft 27 carried by the bracket members 25. The shaft 27 in turn is connected by conventional flexible drive cable 28 to a tilt motor 29 carried conveniently on the bearing block 17. This tilt motor is connected electrically or mechanically to controls provided, for example, in the cockpit of the plane and in usual practice has an operating range of approximately 15° so that desired adjustment of the cam 26 may be effected from the cockpit, with corresponding changes in the tilt of the reflector 11 about its pivot 14. To this end, the cam follower rod 30 operates on the surface of the cam 26. This follower rod 30 is supported suitably between a pair of arms 31 which in turn are attached fixedly to the opposite legs of the U-shaped bracket 13. The cam follower rod 30 is in the form of a cross-bar extending between the arms 31. A substantially U-shaped crosspiece 32 is carried rotatably on the cam follower rod 30 and extends rearwardly of the latter for engagement with a cross-head 33. The cross-head 33 is attached to the ends of a pair of slide rods 34, 35 which are borne slidably in appropriate guideways 36, 37 provided in the bearing block 17.

The opposite ends of the slide rods 34, 35 are joined by a cross-bar 38. The cross-bar 38 is in turn adapted to be engaged by a cam follower 39 provided on a crank 40. The crank 40 is splined or otherwise fixed to a rotatable shaft 41 extending between and carried suitably by the frame members 18 and 19. A second crank 42 likewise is fixed or splined to the shaft 41. The crank 42 is pivotally secured at 43 to the linkage 44. This linkage 44 in turn is secured pivotally at 45 to a crank 46 (Fig. 8). A second crank 47 is secured in fixed angular relationship to the crank 46 and the two cranks 46 and 47 are secured pivotally at 48 to the frame part 19. The crank 47 has a laterally extending portion 47a. A cam follower in the form of a roller 49 is rotatably carried on a stub shaft 50 which is secured to the laterally extending portion 47a of the crank 47 for purposes presently to be described. The axis of the stub shaft 50 carrying roller 49 lies substantially at right angles to the axis of the pivot 48. As the cranks 46, 47 are rotated about the pivot 48, the link 44 coupled to crank 46 effects rotation of cranks 42 and 40. Such movement of the crank 40 is imparted as sliding motion to the slide rods 34, 35 in the block 17. The sliding motion of rods 34, 35 in turn through the engagement of crossbar 33, and crosspiece 32 operates when moved toward the reflector 11 to rotate the arms 31 and thus to rotate the reflector about its pivotal axis 14, i. e., to tilt the reflector. Suitable biasing means presently to be described are provided to maintain the engagement between the crosspiece 32 and cross-bar 33.

A crank 51 is secured fixedly or splined to the reduced portion 16 of the stub shaft 15 which extends rearwardly of bearing 17. This crank is connected pivotally at 52 to the link 53 (Figs. 10 and 11), the latter is connected at 54 to a linkage 55. The portion 55a of the linkage 55 is connected pivotally at 56 to a substantially U-shaped yolk 57. The yolk 57 is secured pivotally at 58 and 59 to opposite faces of the block 20. A cam follower roller 60 is rotatably supported on a stub shaft 61 carried by the yolk 57. The axis of the stub shaft 61 carrying roller 60 lies substantially at right angles to the axis of the pivots 58, 59. Rotation of the yolk 57 about its pivots 58, 59 is transmitted by the linkage 55, and link 53 to the crank 51. This crank in turn correspondingly rotates the shaft 15, 16 about its longitudinal axis for purposes presently to be described. The rollers 49 and 60 which respectively thus control pivotal or tilt motion of reflector 11 about its pivotal axis 14 and its angular shift with the shaft 15, 16 are controlled as will now be described.

An outer gimbal ring 62 is supported by the diametrically oppositely located pivots 63, 64 (Fig. 5) which in turn are supported from the respective uprights 65 and 66 secured, for example, to the frame part 10. A second or inner gimbal ring 67 is supported by the diametrically oppositely located pivots 68 and 69. The latter pivots are spaced apart 90° with respect to the pivots 63 and 64 and are supported by the outer gimbal ring 62. The second or inner gimbal ring 67 has an internal groove 67a (Fig. 6) which serves as a trackway for the two rollers 49 and 60, sufficient clearance being provided between the rollers and the groove walls to permit the rollers to rotate. This clearance is of the order of a few thousandths of an inch so that backlash is negligible.

A servo-motor 70 (Fig. 3) of conventional type either electrical or hydraulic requiring comparatively little power for its operation is secured to the frame part 10 adjacent the outer gimbal ring 62. By way of example, this servo-motor which is of a reversible type has a threaded shaft 71 that receives a traveling nut 72. This nut 72 is coupled, for example, by a linkage 73 to an arm 74 fixed to the outer gimbal ring 62, preferably in a position 90° away circumferentially from the outer gimbal ring pivots 63, 64, so that rotation of the servo-motor shaft 71 in either direction with corresponding longitudinal movement of the travelling nut 72 on shaft 71 will function to rotate the gimbal ring 62 about its pivotal supports 63, 64 in the corresponding direction.

A second servo-motor 75 (Figs. 4 and 5) is secured preferably to a radially extending portion 62a provided on the outer gimbal ring 62 adjacent, for example, the pivot 64. This servo-motor 75 is of the same type as the servo-motor 70. It is provided with a threaded shaft 76 on which a travelling nut 77 is movable in either direction depending upon the direction of rotation of the shaft 76. The travelling nut 77 has an arm 78 coupled by a linkage 79 to an arm 80 which is secured to extend from the inner gimbal ring 67. The arm 80 preferably is located 90° circumferentially from the inner gimbal ring pivots 68, 69 so that operation of the servo-motor 75 will function to rotate the inner gimbal ring 67 in required direction about its pivots 68, 69 depending upon the direction of rotation imparted to the shaft 76 of the servo-motor 75.

As shown, the servo-motor 75 is located on the outer gimbal ring 62. This arrangement is preferable from the point of view of simplicity but not esential, inasmuch as the servo-motor 75 could be mounted on the frame part 10 if suitable coupling arrangements were provided to give the required motion to the inner gimbal ring 67, irrespective of the position of outer gimbal ring 62.

The two servo-motors 70 and 75 are controlled respectively by the positions of the corresponding gimbal rings (not shown) of a gyroscope G illustrated diagrammatically in Fig. 5 and located at some convenient point in the aircraft and designed to operate for the establishment of a fixed axis direction irrespective of bank or pitch of the plane. As the gimbal rings of this gyroscope G change position to maintain the fixed axis adjustment just described, the servo-motors 70 and 75 by electric or fluid connection lines L and M with controls (not shown) operated by the gyroscope's gimbal rings (not shown) are corespondingly actuated, so that the outermost and innermost gimbal rings 62 and 67 are moved automatically to corresponding positions. In consequence, the rollers 49 and 60 which travel in the trackway 67a provided in the inner gimbal ring 67 as shafts 21, 23 are rotated about their support axis, impart compensating movements to the linkages and cranks associated with each to maintain the parabolic reflector 11 in its initially adjusted position, shown for example in Fig. 2, as substantially vertical with the radiator 12 extending along a horizontal axis. This position of the reflector 11 is maintained while the shafts 21 and 23 are oscillated or rotated about the support axis of these shafts through the agency of the gear 24 and irrespective of changes in pitch or bank of the plane, and the angular disposition of said support axis.

A spring biasing means 82 is secured to the stub shaft 15. An arm 82a thereof engages the rear surface of the reflector 11. The purpose of this biasing means is to maintain a bias that tends to rotate the reflector about the pivot 14 to maintain contact between the surfaces of the crosspiece 32 and the cross-head 33 and, also, between the surface of the cross-bar 38 and the cam follower 39 on the crank 40. The stub shaft 15 and the shafts 21 and 23 as well as the block 20 are hollow to permit the passage through them of necessary electrical connections and, also, the wave guide 83 which is of a known flexible form.

In the operation of the construction described, the gyroscope G is set, for example, to provide an erect axial position irrespective of the bank or pitch of the airplane. The servo-motors 70 and 75 are electrically connected to operate in response to the action of the gyroscope gimbal rings in known manner so that any change of the airplane position during flight resulting in movement of the gyroscope gimbal rings will cause the transmission of impulses through the lines L and M to actuate the proper one of the servo-motors 70 and 75 or both of them to produce the necessary changes in positions of the gimbal rings 62 and 67 of the device herein described. For example, Figs. 8 and 9 illustrate what occurs if the airplane executes a bank only resulting in a counterclockwise rotation of the airplane part 10 to the angular position shown in Figs. 8 and 9. In order to maintain the reflector 11 in the position shown in these figures which is its initially adjusted position, as shown in Figs. 1 and 2, wherein the longitudinal axis of the radiator 12 lies horizontal and the transverse axes A—A, B—B of the reflector 11 lie in a plane that is perpendicular to the horizontal, and despite the bank of the plane, it is necessary for the gimbal rings 62 and 67 to maintain their coplanar relationship relative to each other. At the same time, however, it becomes necessary for them to be rotated about the pivots 63 and 64 in the clockwise direction so that their plane assumes the horizontal, irrespective of the fact that the plane of the airplane part 10 is at an angle with the horizontal and the axis of shafts 21, 23 no longer is vertical. To effect this, the electrical or other impulses from the gyroscope G actuate the servo-motor 70 to cause the travelling nut 72 thereon to move downwardly sufficiently for the gimbal rings 62 and 67 to assume the horizontal position shown in Figs. 8 and 9. The servo-motor 75 is not actuated so that the coplanar position of the two gimbal rings remains unchanged.

The unitary change in position of the two gimbal rings 62 and 67, with respect to the plane of the airplane part 10, causes the cam followers 49 and 60 through their associated cranks and linkages to effect compensating motions of the reflector 11 about its pivot 14 and simultaneously a compensating rotation of the shaft 15 in the bearing 17, as the shafts 23, 21 continue to be rotated or oscillated. These motions maintain the reflector 11 in the same relative position as shown clearly in Fig. 2 and in Fig. 8. In other words, the roller 49 moving in the trackway of the gimbal ring 67 through the cranks 47, 46, linkage 44, crank 42, crank 40, cam follower 39, slide rods 37, crossbar 33, cross member 32, cam follower 30 and cam 26 operates to maintain the radiator 12 along a horizontally disposed axis by tilting the reflector 11 from its initial position relative to the pivot 14 sufficiently to compensate for the angular shift of the longitudinal axis of shaft 15, 16 relative to the horizontal. At the same time, the cam follower 60 also moving in the gimbal ring groove 67a operates the yolk 57, the linkages 55, 53 and crank 51 to impart a compensating rotation of the stub shaft 15 about its longitudinal axis so as to maintain the reflector 11 in its initially adjusted position. For example, if the upright arm 82a of the biasing member 82 that engages the reflector 11 is chosen as a reference, it will be observed from Figs. 1, 2, 8 and 9 that it must maintain its vertical upright position. To effect this there must be compensating angular rotation of the shaft 15, 16 so that the reflector remains in its initially adjusted position and the transverse axes A—A, B—B of the beam radiated from the reflector 11 remain unchanged, despite the fact that the transverse axis of the airplane, and the axis of shafts 21, 23 have been inclined to an extent corresponding to the angle of bank.

When the plane undergoes both pitch and bank, the frame part 10 and shafts 15, 16, 21 and 23 undergo corresponding angular changes both with respect to the angle of bank and with respect to the angle of pitch. The frame part 10 and shaft 15, 16 in Figs. 10 and 11 are shown in the double angular disposition assumed for a specific bank or roll and a specific pitch. The movements of the gyroscope parts in the airplane to compensate for these changes are transmitted as impulses through lines L and M to the respective servo-motors 70 and 75. The threaded shafts 71 and 76 of these motors as a result are rotated in required directions in response to the impulses received from the gyroscope control to effect movement of the respective travelling nuts 72 and 77 to cause compensating movements of the respective gimbal rings 62 and 67 to bring them to the relative positions shown in Figs. 10 and 11. Therein, because of the fact that the plane part 10 has undergone both a bank and a pitch the result is that these gimbal rings 62 and 67 assume positions that no longer are coplanar but such that the planes of these two gimbal rings lie angularly disposed relative to each other. The angular disposition is sufficient for the rollers 49 and 60 moving over the trackway 67a of the inner gimbal ring 67 to impart compensating movements to the linkages and cranks connected to the reflector 11 and to the stub shaft 15 to maintain the reflector 11 in its initially adjusted position wherein the longitudinal axis of the radiator 12 remains horizontal and the transverse axes A—A and B—B of the beam reflected from the reflector 11 remain unchanged.

The servo-motors 70 and 75 are highly sensitive and substantially instantaneous in their response to the changing positions of the gyroscope parts which in turn shift with the bank and tilt of the plane so that the gimbal rings 62 and 67 move substantially instantaneously to compensating positions as a result of the action of their servo-motors 70 and 75. Consequently compensating angular movement of the reflector 11 about the pivot 14 and compensating angular rotation of the stub shaft 15, 16 about its longitudinal axis to maintain the initially adjusted position of the reflector 11 are effected. Thus, with the mechanism described herein, the disposition of the radar beam relative to the target remains unchanged irrespective of bank and pitch of the airplane.

The function of the tilt motor 29 which is controlled from a cockpit is simply to provide an initial adjustment of the cam 26 and thereby to provide an initial position of the reflector 11 and its radiator 12 relative to the target. For example, it may be the horizontal disposition of the radiator 12 shown in the figures, or else, by adjustment of the cam 26, the radiator 12 may be adjusted to a position such that its longitudinal axis lies at an angle with the horizontal (not shown). Irrespective, however, of what initial adjustment is made of the radiator 12, until the tilt motor 29 is again actuated, the action of the servo-motor controlled gimbal rings 62 and 67 will be such as to maintain the adjusted disposition of the radiator 12 and reflector 11 until a further adjustment is made of the tilt motor as required by changed target conditions. The angle of pitch or angle of bank of the plane, however, will automatically be compensated for by compensating shifts of the two gimbal rings 62 and 67 so that roll or pitch of the plane will be immaterial in so far as the radar beam which is transmitted to the target is concerned.

The entire mechanism described is, for practical purposes, positioned in a protected region of the plane, for example, in a blister on the plane fuselage or in front of a Plexiglass or other transparent opening in the plane so as to be unaffected by atmospheric conditions. The comparatively light weight of the parts operating the reflector 11 and radiator 12 eliminates largely the problem of inertia of large masses and permits the use of simple low powered servo-motors that are very sensitive and quick to respond to changing conditions. Also, the light weight of the linkages and cranks eliminates largely the problem of inertia in so far as movements thereof are concerned in response to positioned changes effected in them by the changes in positions of the gimbal rings 62 and 67.

In effect, the gimbal rings 62 and 67 are activated upon deviation from the normal initial position of the axis of the shaft parts 21, 23 so that compensating angular rotation is given to the shaft 15 through crank 51 and associated linkages and the cam follower 60 moving in the groove 67a of the gimbal ring 67 and so that compensating tilting motion about the axis 14 is given to the reflector 11 through the cranks, linkages, and slide rods coupled to the cam follower 49. As a result the reflector is maintained in its initially adjusted position with reference to the target irrespective of the deviations from normal position during flight of the axis of shaft parts 21, 23.

While a specific embodiment of the invention has been shown in the various figures and described herein, it is to be understood that variations in structural detail are possible and are contemplated. There is no intention, therefore, of limitation to the exact details shown and described.

What is claimed is:

1. In radar antennae equipment for use with aircraft, a radar beam reflector, a member rotatably supported at a fixed angle relative to a support axis, means for pivotally supporting said reflector from said member, an outer gimbal ring, means for pivotally supporting said gimbal ring, an inner gimbal ring concentric with the outer gimbal ring, means for pivotally supporting said inner gimbal ring from the outer gimbal ring, said inner gimbal ring having an annular groove, cam followers movable on said groove, means coupling one of said followers to said member to effect compensating rotation thereof and means coupling a second of said followers to said reflector to effect a compensating pivotal motion thereof in response to positional changes of said gimbal rings resulting from positional changes of the aircraft in flight to maintain said reflector in an initially adjusted disposition relative to a target.

2. In combination with a radar reflector adapted for rotation about a support axis that has a fixed normal position relative to an aircraft, a rotatable shaft, means for pivotally supporting said reflector from the shaft for tilting on an axis perpendicular to the shaft axis, an outer gimbal ring, means for pivotally supporting said ring, an inner gimbal ring supported pivotally from the outer ring, cam followers movable over a surface of said inner ring, means for coupling one of said followers to said rotatable shaft, means for coupling another of the followers to said reflector, and servo-motor means for effecting compensating movements of the gimbal rings required by deviations from the normal position of the support axis during flight of the aircraft with corresponding transmission to the reflector of compensating movements through the cam followers and coupling means associated therewith to maintain said reflector in an initially adjusted position with reference to a target.

3. In combination with a radar reflector adapted for rotation about a support axis that has a fixed normal position relative to an aircraft, a rotatable shaft, means for pivotally supporting said reflector from the shaft for tilting on an axis perpendicular to the shaft axis, an outer gimbal ring, means for pivotally supporting said ring, an inner gimbal ring supported pivotally from the outer ring, cam followers movable over a surface of said inner ring, means for coupling one of said followers to said rotatable shaft, means for coupling another of the followers to said reflector, servo-motor means for effecting compensating movements of the gimbal rings required by deviations from the normal position of the support axis during flight of the aircraft with corresponding transmission to the reflector of compensating movements through the cam followers and coupling means associated therewith to maintain said reflector in an initially adjusted position with reference to a target, and means responsive to said deviations resulting from changing disposition of the longitudinal and transverse axes of the aircraft during flight for operating said servo-motors.

THEODORE W. KENYON.

REFERENCES CITED

The following references are of record in the file of this patent:

UNITED STATES PATENTS

| Number | Name | Date |
| --- | --- | --- |
| 2,047,922 | Seligmann | July 14, 1936 |
| 2,080,490 | Kollsman | May 18, 1937 |
| 2,170,087 | McPherson | Aug. 22, 1939 |
| 2,396,038 | Bossi | Mar. 5, 1946 |
| 2,405,058 | Ross | July 30, 1946 |
| 2,407,275 | Hays, Jr. | Sept. 10, 1946 |
| 2,407,310 | Lundy et al. | Sept. 10, 1946 |
| 2,412,631 | Rice | Dec. 17, 1946 |